United States Patent
Johnson et al.

(10) Patent No.: US 10,012,028 B2
(45) Date of Patent: Jul. 3, 2018

(54) SYSTEM, METHOD AND COMPUTER PROGRAM PRODUCT FOR A RUG PLOT FOR GEOSTEERING APPLICATIONS

(71) Applicant: Landmark Graphics Corporation, Houston, TX (US)

(72) Inventors: Paul Blair Johnson, Houston, TX (US); Bronwyn Michaell Calleja, Balikpapan (ID)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 93 days.

(21) Appl. No.: 14/437,763

(22) PCT Filed: Nov. 13, 2012

(86) PCT No.: PCT/US2012/064777
§ 371 (c)(1),
(2) Date: Apr. 22, 2015

(87) PCT Pub. No.: WO2014/077799
PCT Pub. Date: May 22, 2014

(65) Prior Publication Data
US 2015/0292266 A1 Oct. 15, 2015

(51) Int. Cl.
| G01V 3/00 | (2006.01) |
| E21B 7/06 | (2006.01) |
| E21B 7/04 | (2006.01) |
| E21B 41/00 | (2006.01) |
| G01V 99/00 | (2009.01) |
| G05B 13/04 | (2006.01) |

(52) U.S. Cl.
CPC ............. *E21B 7/06* (2013.01); *E21B 7/04* (2013.01); *E21B 41/0092* (2013.01); *G01V 99/005* (2013.01); *G05B 13/04* (2013.01)

(58) Field of Classification Search
None
See application file for complete search history.

(56) References Cited

U.S. PATENT DOCUMENTS

| 5,706,892 A | 1/1998 | Aeschbacher, Jr. et al. |
| 8,463,549 B1* | 6/2013 | Selman ............... E21B 7/04 702/11 |
| 2003/0074139 A1 | 4/2003 | Poedjono |

(Continued)

FOREIGN PATENT DOCUMENTS

| RU | 2305184 C2 | 8/2007 |
| WO | WO 2006/053294 A1 | 5/2006 |

OTHER PUBLICATIONS

International Search Report and the Written Opinion of the International Searching Authority, or the Declaration, dated Jan. 22, 2013, PCT/US2012/064777, 8 pages, ISA/US.

(Continued)

*Primary Examiner* — Thomas McCormack
(74) *Attorney, Agent, or Firm* — Haynes and Boone, LLP (57) ABSTRACT

A system utilized to geosteer a downhole assembly provides a real-time, 3-Dimensional ("3D") visualization of the downhole assembly and surrounding formation as it moves through the formation. The 3D visualization, or model, may be updated in real-time and may display real-time data related to various downhole conditions and geologic characteristics.

27 Claims, 7 Drawing Sheets

(56) References Cited

U.S. PATENT DOCUMENTS

| | | |
|---|---|---|
| 2005/0060096 A1 | 3/2005 | Hutchinson |
| 2005/0171698 A1 | 4/2005 | Sung et al. |
| 2005/0140373 A1* | 6/2005 | Li .................... G01V 3/30 324/338 |
| 2006/0074561 A1 | 4/2006 | Xia et al. |
| 2006/0247903 A1 | 11/2006 | Schottle et al. |

OTHER PUBLICATIONS

Allen, et al. "Modeling Logs for Horizontal Well Planning and Evaluation," *Oilfield Review*, vol. 7, No. 4, Jun. 19, 1995, pp. 47-63.
Written Opinion of the Intellectual Property Office of Singapore, dated Jun. 9, 2016, 11201502922Y, 5 pages.
Singapore Written Opinion issued for Patent Application No. 11201502922Y, dated Nov. 3, 2016, 5 pages.
Russian Office Action for Patent Application No. 2015116535, dated Sep. 5, 2016, 6 pages.

* cited by examiner

SYSTEM, METHOD AND COMPUTER PROGRAM PRODUCT FOR A RUG PLOT FOR GEOSTEERING APPLICATIONS

The present application is a U.S. National Stage patent application of International Patent Application No. PCT/US2012/064777, filed on Nov. 13, 2012, the benefit of which is claimed and the disclosure of which is incorporated herein by reference in its entirety.

FIELD OF THE INVENTION

The present invention relates generally to geosteering in hydrocarbon reservoirs and, more specifically, to a geosteering system that provides real-time, 3-Dimensional ("3D") modeling of a well path to optimize well placement.

BACKGROUND

Conventionally, one of the challenges in drilling horizontal wells for accurate well placement is that sedimentary depositional environments are inherently complicated. Channel sands are one such depositional environment which is typically very difficult to model and view in three dimensions. To date, operators have been limited to hand drawn pictures or curtain plots that only model along a vertical plane showing the geology above and below a desired area.

Accordingly, there is a need in the art for a geosteering system that not only provides visualization above and below a desired section of the wellbore, but also provides visualization to the left and right of that section, thus providing a complete, real-time, 3D visualization.

DESCRIPTION OF ILLUSTRATIVE EMBODIMENTS

Illustrative embodiments and related methodologies of the present invention are described below as they might be employed in a 3D geosteering application that optimizes well placement. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
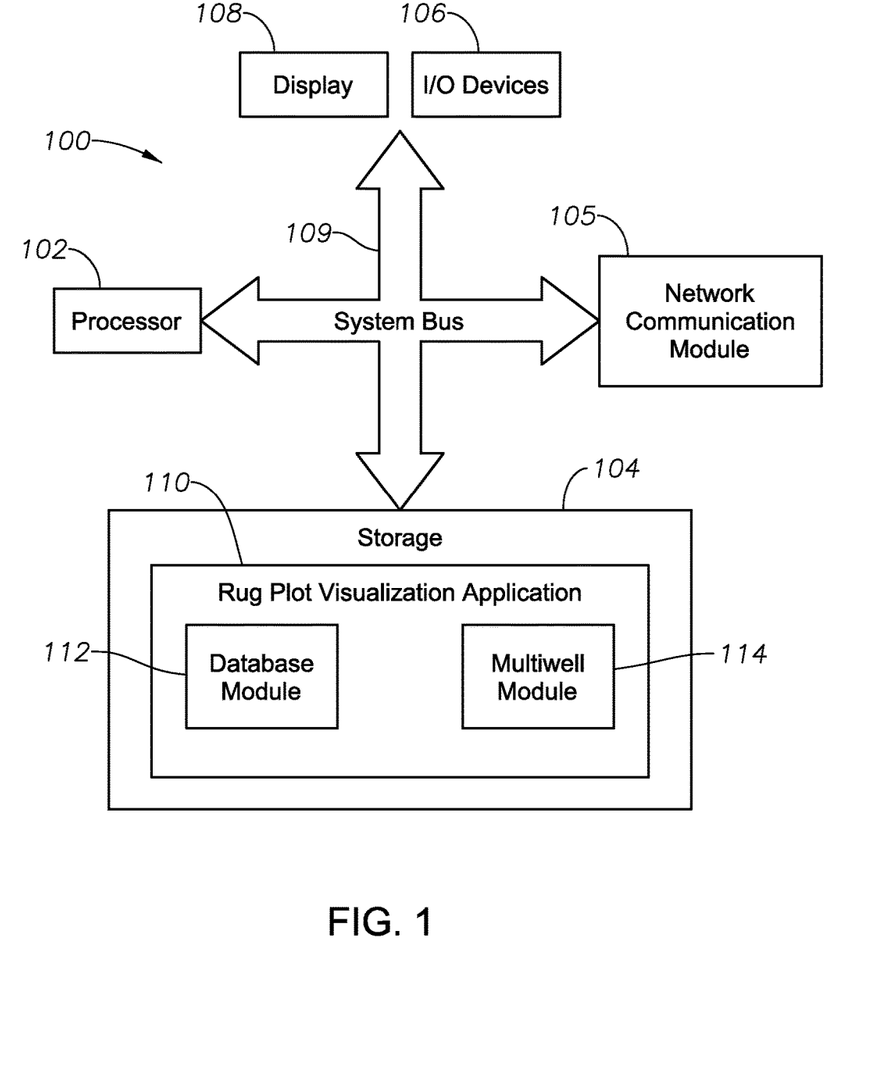
FIG. 1 illustrates a block diagram of rug plot visualization system according to an exemplary embodiment of the present invention.

FIG. 1 shows a block diagram of rug plot visualization system 100 according to an exemplary embodiment of the present invention. As will be described herein, exemplary embodiments of rug plot visualization system 100 provides a platform in which to visualize the left to right orientation of a near-horizontal wellbore along a near-horizontal plane as the wellbore moves up and down. However, those ordinarily skilled in the art having the benefit of this disclosure will also realize the embodiments disclosed herein may also be applied to horizontal and non-horizontal wellbores. Nevertheless, the "rug plot" provides a display whereby the geology of the formation is virtually sliced horizontally along a desired path such that the left to right movement of the drill string is visualized in real-time. Also, as will be described herein, the present invention provides visualization of the up and down movement of the drill string along the desired path (the well path, for example). As such, the ability to geosteer in the left, right, up and down directions, as with channel sands or along steeply dipping formations, is provided. Accordingly, exemplary embodiments of the present invention provide a full 3D horizontal and vertical visualization of the well path.

Referring to FIG. 1, rug plot visualization system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within rug plot visualization application 110 in accordance with the exemplary embodiments described herein, may be stored in storage 104 or some other computer-readable medium.

Although not explicitly shown in FIG. 1, it will be recognized that rug plot visualization system 100 may be connected to one or more public and/or private networks via one or more appropriate network connections. It will also be recognized that the software instructions comprising rug plot visualization application 110 may also be loaded into storage 104 from a CD-ROM or other appropriate storage media via wired or wireless methods.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof in a computer system or other processing system.

In certain exemplary embodiments, rug plot visualization application 110 comprises multi-well module 114 and database module 112. Database module 112 provides robust data retrieval and integration of historical and real-time well related data that spans across all aspects of the well construction and completion processes such as, for example, drilling, cementing, wireline logging, well testing and stimulation. Moreover, such data may include, for example, well trajectories, log data, surface data, fault data, etc. The database (not shown) which stores this information may reside within database module 112 or at a remote location. An exemplary database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

Rug plot visualization application 110 utilizes multi-well module 114 to interface with the data stored within database module 112. As such, multi-well module 114 provides, for example, the ability to select data for a multi-well project, edit existing data and/or create new data as necessary to interpret and implement the 3D well visualizations of the present invention. An exemplary multi-well platform includes, for example, the MultiWell functionality that forms part of the INSITE® software suite. However, those ordinarily skilled in the art having the benefit of this disclosure realize other similar platforms may be utilized.

Still referring to the exemplary embodiment of FIG. 1, rug plot visualization application 110 also performs the geological interpretation and earth modeling functions of the present invention that enable, for example, formation visualization, pre-well studies, real-time geosteering and post-well interpretations. To achieve this, as will be described herein, rug plot visualization application 110 uploads the multi-well job data from multi-well module 114 (via utilization of database module 112), performs various interpretational and forward modeling operations on the data, and utilizes display 108 to provide desired visualizations (for example, a rug plot) of the data. Exemplary visualization applications include, for example, StrataSteer® 3D or DecisionSpace® Desktop Suite, the latter being commercially available through Landmark Graphics Corporation of Houston, Tex., the Assignee of the present invention. However, those ordinarily skilled in the art realize there are a variety of similar software platforms which may be utilized to perform these functions of the present invention.

As previously stated, rug plot visualization system 100 provides a 3D visualization of a geologic formation and well trajectory. The 3D visualization includes a rug plot, which models a horizontal, left to right orientation of a variable True Vertical Depth ("TVD") slice within the geological formation. In certain exemplary embodiments, the selected TVD slice is chosen to correspond to the trajectory of the well path. However, those ordinarily skilled in the art having the benefit of this disclosure will realize the TVD slice can be selected to correspond to any desired portion of the geological formation or well path. Nevertheless, in addition, exemplary embodiments of the present invention also model a "curtain plot," which is a vertical visualization of the wellbore showing the up and down orientation of the selected TVD slice within the geological formation. Accordingly, the curtain plot in combination with the rug plot provides a full 3D visualization of the selected TVD slice.

Figure 2A:
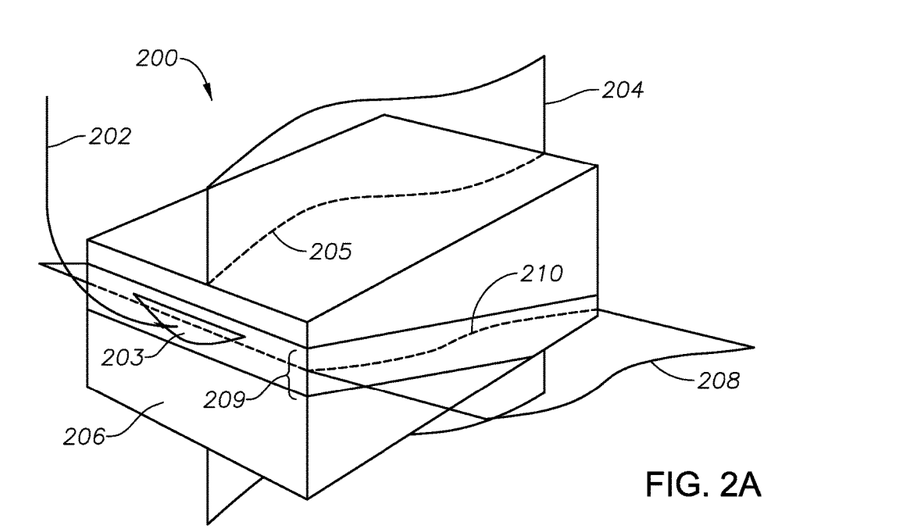
FIG. 2A illustrates a formation utilized to explain an exemplary embodiment of the present invention.

The exemplary earth model of FIG. 2A is provided for further illustration and understanding of the curtain and rug plot concepts of the present invention. In this exemplary embodiment, a formation 200 has been modeled that includes a well path 202 traversing through a hydrocarbon channel 203. Although described herein as a channel, the well path may be modeled along any desired portion of the formation. A curtain plot 204 is illustrated as a vertical slice along the left and right travel of well path 202, thus showing the up and down orientation of well path 202 along formation 200. Dotted line 205 represents the extrapolated path of well path 202 in the vertical plane from the TVD of well path 202 in the earth model. A drilling cross section 206 is also illustrated, which reflects a slice of formation 200 that is perpendicular to the travel of well path 202. In addition to curtain plot 204, a rug plot 208 is illustrated which represents a horizontal variable TVD slice 209 of formation 200 along the up and down travel of well path 202, thus providing a visualization of the left and right orientation of well path 202 along formation 200. Dotted line 210 represents the extrapolated path of well path 202 in the horizontal plane from the TVD of well path 202 in the earth model.

As will be understood by those ordinarily skilled in the art having the benefit of this disclosure, a TVD slice is a slice of formation at a set TVD value such as, for example, 2000 meters True Vertical Depth. As such, a variable TVD slice (for example, TVD slice 209), as described in certain exemplary embodiments, is one that is oriented along the well path, or other deviated path, such that it includes multiple True Vertical Depths. For example, a variable TVD slice might begin at 2000 mTVD, grade to 2050 mTVD, before coming back up to 2010 mTVD.

Still referring to the exemplary embodiment of FIG. 2A, well path 202 may be geosteered up and down in the TVD slice utilizing curtain plot 204, with measured depth (or horizontal displacement from the origin) of the well being defined along the horizontal axis and the TVD being defined along the vertical axis. However, as described herein, the present invention also provides a rug plot visualization of more complex reservoirs that require the ability to geosteer left and right, as with channel sands or along the strike of steeply dipping formations.

Figure 2B:
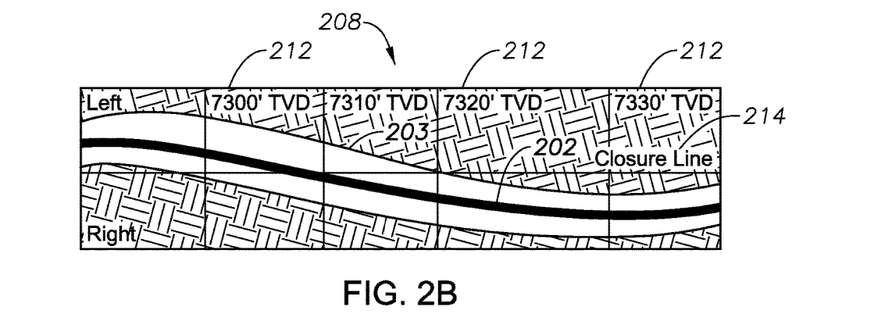
FIG. 2B illustrates a rug plot according to an exemplary embodiment of the present invention.
Figure 2C:
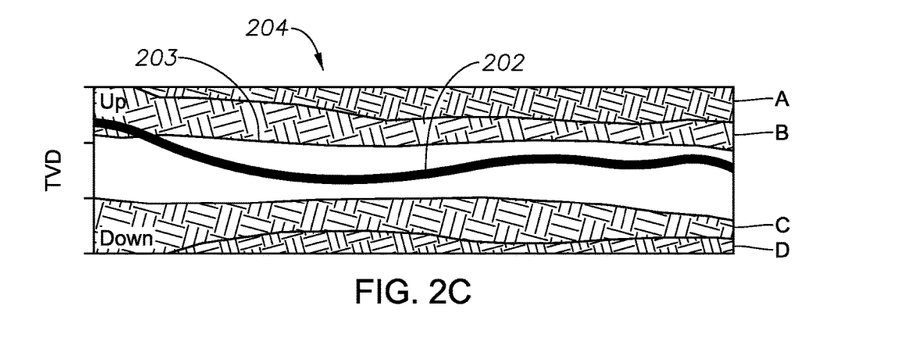
FIG. 2C illustrates a curtain plot according to an exemplary embodiment of the present invention.

FIGS. 2B and 2C illustrate exemplary embodiments of a rug plot 208 and curtain plot 204, respectively. Referring to FIG. 2B, rug plot 208 provides a modeled visualization of the left to right movement of well path 202 along a desired TVD slice. In this embodiment, the selected TVD slice corresponds to channel 203. Also, in this exemplary embodiment, the center line for rug plot 208 is the closure line 214 (defines a depth along a vertical section direction, as understood in the art). Rug plot 208 also plots the TVD 212, which reflects that TVD 212 is increasing with measured depth, so well path 202 reflects downward drilling in this example. Accordingly, exemplary embodiments of rug plot 208 essentially provides visualization of a variable TVD slice including left to right orientation within a geological is model. Again, the variable TVD slice can be taken along the well path or any other desired trajectory within the geological model.

FIG. 2C illustrates an exemplary embodiment of curtain plot 204 displayed. A plurality of heterogeneous formation layers A-D are shown, along with channel 203, in addition to TVD 212. Curtain plot 204 reflects the up and down movement of well path 202 along channel 203. Accordingly, through modeling of curtain plot 204 and rug plot 208, exemplary embodiments of the present invention provide 3D visualization of the geology to assist in geosteering and, thus, optimal placement of a wellbore.

Figure 3A:
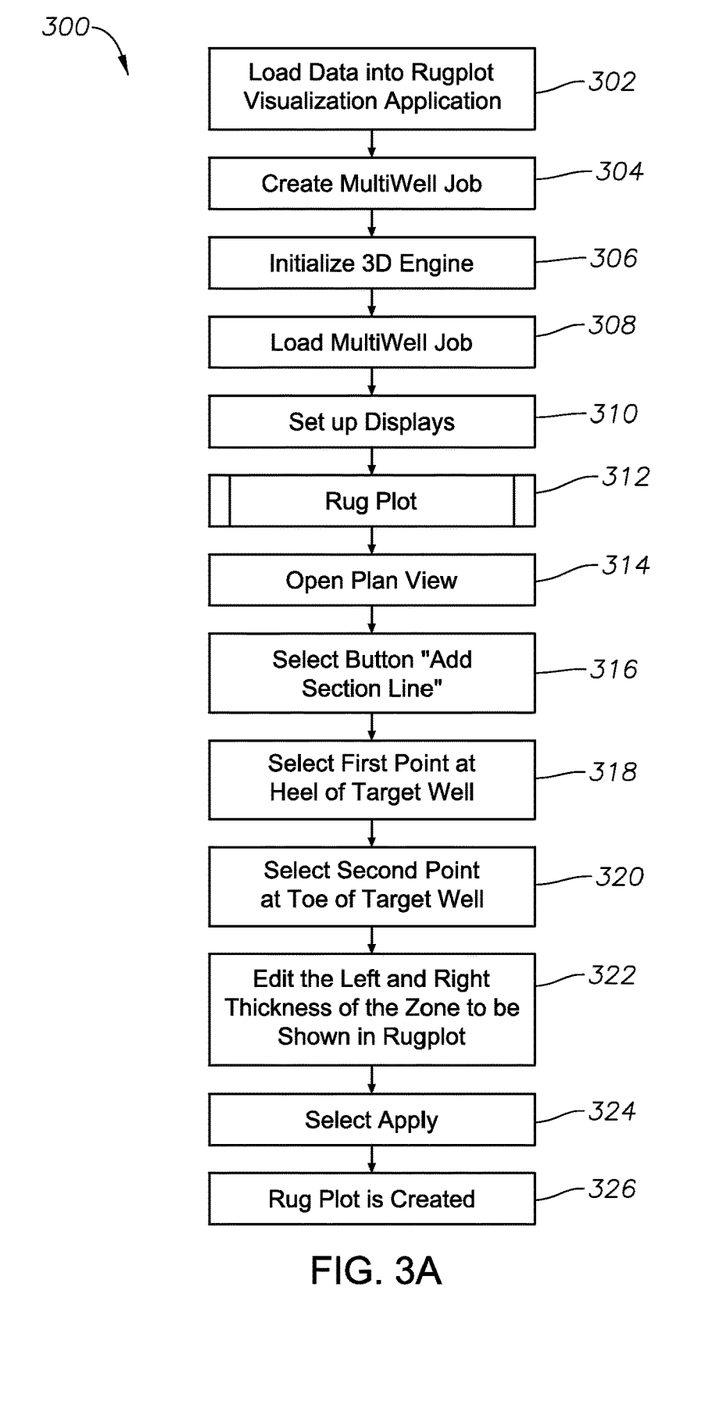
FIG. 3A is a rug plot workflow according to an exemplary methodology of the present invention.

Referring to FIG. 3A, an exemplary methodology of the present invention utilized to model a rug plot via a user interface (for example, display 108 & I/O device 106) will now be described. At block 302 of methodology 300, rug plot visualization application 110 (via processor 102) loads the well data from storage (local or remote) into database module 112. Here, the data uploaded may include manually and automatically uploaded data. Manual data may include, for example, data related to well location and trajectories, as well as log data. Automatic data may include, for example, data related to surface(s) and fault(s) along the formation. At block 304, through utilization of multi-well module 114, rug plot visualization application 110 models a multi-well job corresponding to the well data uploaded to database module 112 at block 302.

At block 306, rug plot visualization application 110 initializes its 3D engine (not shown), and the multi-well job data (surface(s), fault(s), wells, log data, etc., for example) is uploaded into the engine at block 308. At block 310, rug plot visualization application 110 sets up the displays which may be user defined or automatically populated by rug plot visualization application 110. Here, rug plot visualization application 110 creates a pseudo log at each measured depth location along the well path and creates the geological section along the vertical plane of the measured depth location. Exemplary display options include, for example, a 3D map view (3D display using, for example, Easting, Northing and TVDsubsea axes with surfaces, faults, well paths and log data displayed accordingly), plan view, curtain plot, drilling cross section (2D plot with TVD or TVDsubsea along the vertical axis, with distance left and right of the well path along the horizontal axis, the well path located in the middle of display), and rug plot.

Figure 3B:
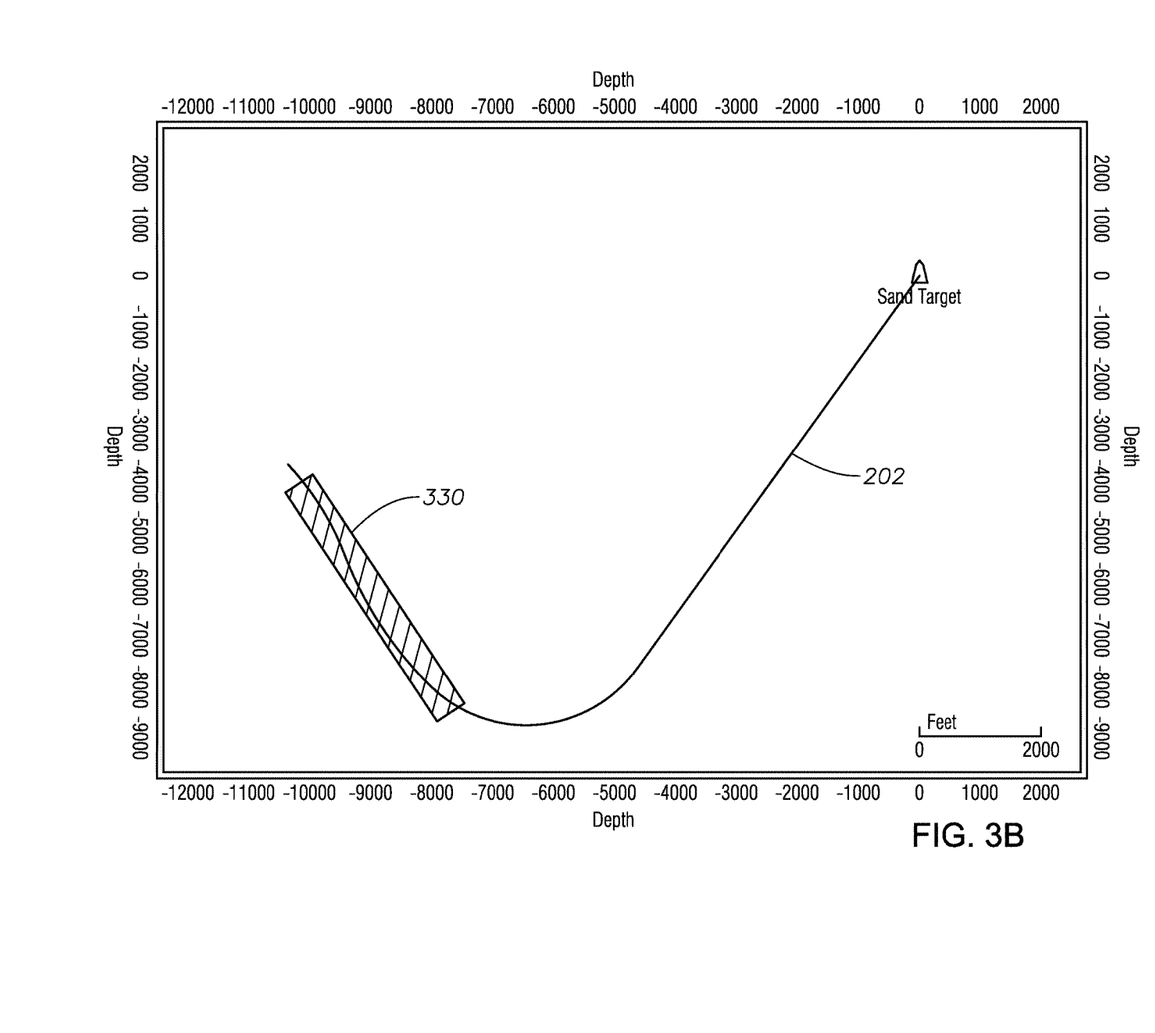
FIG. 3B is a plan view utilized in the workflow chart of FIG. 3A.

At block 312, rug plot visualization application 110 detects that the "rug plot" option has been selected in this example. At block 314, rug plot visualization application 110 then initializes the "plan view," as shown in FIG. 3B, which reflects an azimuthal visualization of well path 202 created in block 304. Here, the data displayed includes well location and trajectories. In this embodiment, the plan view is a 2D view with Easting as the horizontal axis and Northing as the vertical axis, with Universal Transverse Mercator data being utilized to plot trajectories and well head locations. Thereafter, rug plot visualization application 110 awaits the definition of a section line 330 which represents the section of well path 202 defining the variable TVD slice to be model as the rug plot.

In order to define section line 330, rug plot visualization application 110 may display an "add section line" button via display 108 (block 316). At block 318, a first point at the heel of well path (i.e., target well) 318 is selected via the user interface and detected by rug plot visualization application 110. At block 320, a second point at the toe of well path 202 is selected via the user interface and detected by rug plot visualization application 110. Section line 330 may be defined along any section of the formation or well path such as, for example, the closure line or a vertical defined section. Rug plot visualization application 110 then displays the section line 330 and the azimuth of the section line. Although described herein as first selecting the heel point followed by the toe point, such selection is not required, as would be readily appreciated by those ordinarily skilled in the art having the benefit of this disclosure.

Thereafter, at block 322, the user is allowed to edit the length and left and right thickness of the zone to be modeled and visualized along section line 330 in the rug plot. To do so, one side of section line 330 may be clicked and dragged as desired until the desired thickness is reached, or some other suitable method of thickening line 330 may be utilized. As a result, in reference to FIG. 2B, the amount of the formation displayed in rug plot left and right of channel 203 will be altered. Once the thickness is determined, rug plot visualization application 110 awaits the selection of the "apply" button at block 324.

Once rug plot visualization application 110 detects the "apply" signal, rug plot visualization application 110 then models and displays the rug plot at block 326. In order to model the rug plot at block 326, rug plot visualization application 110 represents the well path location within an X, Y, and Z plane. As would be understood by those ordinarily skilled in the art having the benefit of this disclosure, data libraries and co-locating co-kriging algorithms are utilized to calculate log data values along the length of the well path and the horizontal left/right sides perpendicular to the well path. Utilizing this log data, rug plot visualization application 110 can now generate the full 3D visualization of the desired path. Thereafter, rug plot visualization application 110 then displays the log data as pixels and colors the log data according to some pre-defined log scale (same log scale utilized in a curtain plot display, for example). In certain exemplary embodiments, the rug plot may be displayed below the curtain plot and utilize the same measured depth range and scale as the curtain plot, thus providing a full 3D visualization of the well path.

Figure 4:
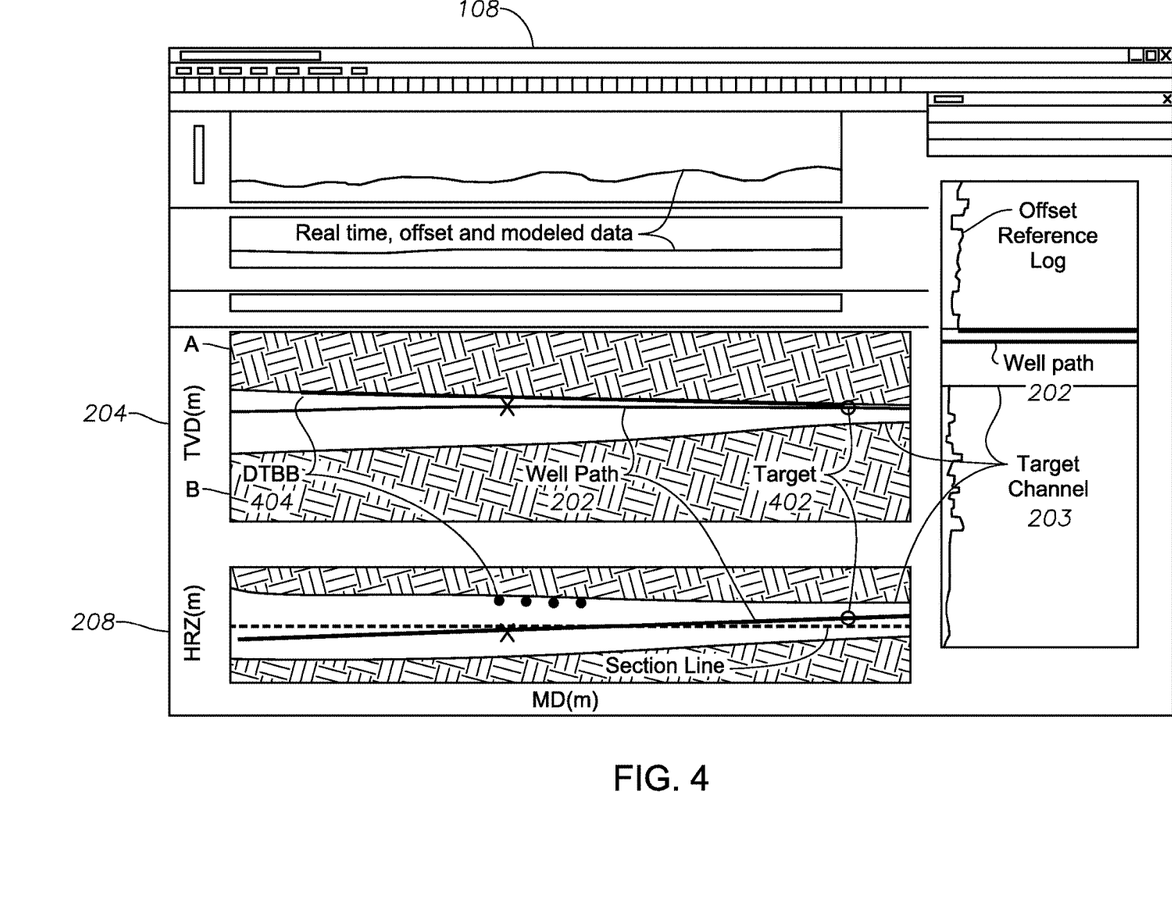
FIG. 4 is a display showing a rug and curtain plot generated by an exemplary embodiment of the rug plot visualization system of the present invention.

FIG. 4 illustrates yet another exemplary embodiment of the present invention whereby rug plot 208 is displayed below curtain plot 204 on a display 108. In this embodiment, a well path 202 is being drilled in real-time, with the drill bit being reflected as the "X." As such, the portion of well path 202 behind the drill bit X is the portion of well path 202 which has been drilled, while the portion in front of drill bit X is the portion of well path 202 that has been modeled by rug plot visualization application 110 and has yet to be drilled. As drill bit X (and thus the drilling assembly) advances through channel 203, its trajectory will vary left to right (as can be seen in rug plot 208) in relation to the geological cross-section. At the same time, curtain plot 204 provides visualization of formation layers A and B above and below well path 202, respectively, as well as drill bit X as it moves up and down channel 203. Accordingly, through utilization of rug plot 208 and curtain plot 204, exemplary embodiments of the present invention provides a left to right and up and down visualization (i.e., 3D visualization) of drill bit in real-time.

Still referring to FIG. 4, rug plot visualization application 110 also models a series of targets 402 along well path 202 that reflect the optimal path for well path 202. As would be understood by those ordinarily skilled in the art having the benefit of this disclosure, there are a variety of methodologies by which to determine an optimal well path. Thus, during operations, the drilling assembly traveling along well path 202 will be geosteered to hit targets 402, thus assuring the optimal well path is achieved.

Moreover, in this exemplary embodiment, the scales displayed on rug plot 208 and curtain plot 204 are different. As will be understood by those ordinarily skilled in the art having the benefit of this disclosure, different zoom magnifications may be necessary to highlight and edit certain geological features of rug plot 208 and curtain plot 204. As such, the scales may be different vertically to horizontally depending on the channel sand geometries. Although the measured depth for each is plotted along the x-axis of the plots, rug plot 208 has modeled channel 203 along a y-axis reflecting left to right movements of the section line, reflecting a horizontal scale that is 20 meters across, while curtain plot 204 has been plotted along y-axis reflecting a TVD range.

In addition, this exemplary embodiment of the present invention displays the distance to bed boundaries ("DTBB") 404 along curtain plot 204 and rug plot 208. Here, rug plot visualization application 110 has modeled the edge boundaries of channel 203 based upon the well related data received from database module 112 and multi-well module 114. The geology and DTBB 404 may also be updated and displayed in the plots in real-time based upon petrophysical tools/sensors positioned along the drilling assembly traveling well path 202. In one embodiment, DTBBs 404 are calculated behind the bit where the resistivity sensor is positioned. By editing relevant formation bed surfaces to match the DTBB locations, trends of the DTBB results behind the bit may be used to predict ahead of the bit. Exemplary sensors may include seismic, electromagnetic, or similar sensors that detect characteristic data of the formation and the position of the drilling assembly. Various other petrophysical tools/sensors may be utilized to provide such real-time feedback, as would be understood by those ordinarily skilled in the art having the benefit of this disclosure. As will be described below, DTBB 404 is calculated based upon the real-time data received from the drill string as it travels along well path 202. Nevertheless, as the drilling assembly continues to move along well path 202, the DTBB 404 is calculated and displayed. Therefore, well path 202 may be geosteered accordingly to maintain the optimal well path along targets 402 in order to drain the maximum volume of reserves.

Further referring to FIG. 4, display 108 also includes a variety of real-time data related to downhole conditions and geologic characteristics. In certain exemplary embodiments, rug plot visualization application 110 may also retrieve and process real-time data acquired by various petrophysical tools/sensors within the downhole assembly. Such data may include, for example, offset psuedolog data, offset reference log and modeled data. Exemplary offset pseudolog data may include the pseudologs created from similar log data from multiple offset wells using a co-locating co-kriging algorithm, be plotted along the measured depth of the well path, and can be used to correlate against the realtime data. Exemplary offset reference log data may be the same as the offset pseudolog data; however, it may be plotted vertically at a set measured depth of the well path, which can be changed by simply moving the cursor along well path 202 in display windows of curtain plot 204 or rug plot 208. The modeled data may use the pseudolog data and geological surfaces from curtain plot 204 as input and forward-model a predicted curve or image according to the sensor properties chosen. Such real-time data may be displayed as single value curves or azimuthal images, for example. Those ordinarily skilled in the art having the benefit of this disclosure realize this, and a variety of other data, may be integrated within the present invention.

Figure 5A:
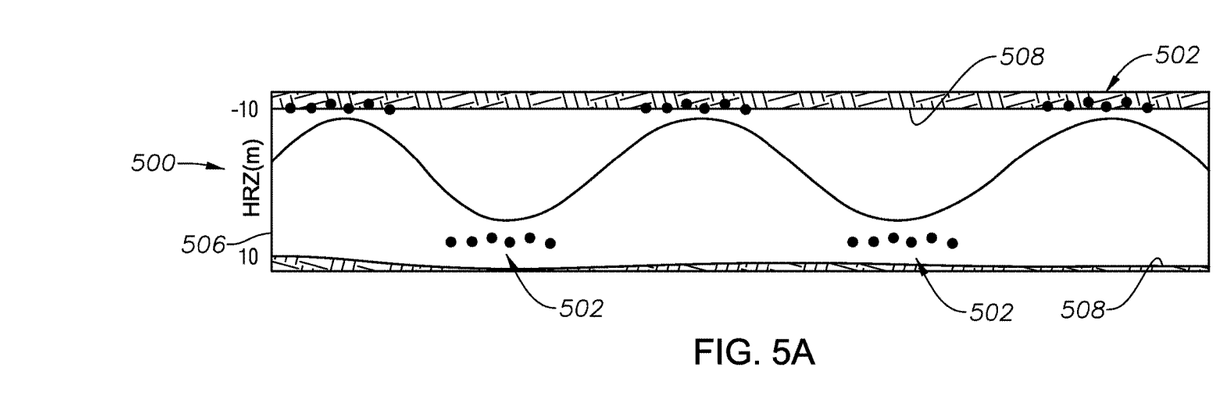
FIGS. 5A and 5B illustrate real-time editing of the geological formation given a distance to bed boundary calculation according to an exemplary embodiment of the present invention.
Figure 5B:
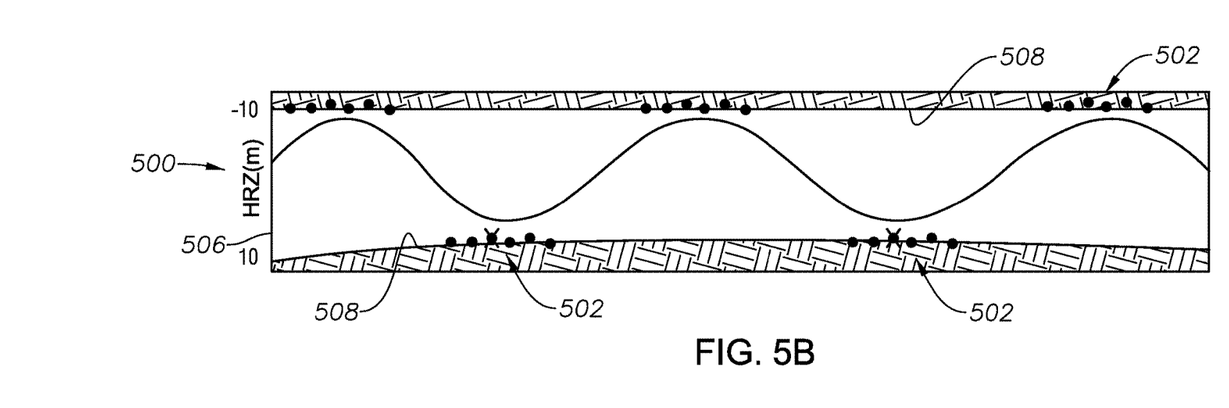

In another exemplary embodiment of the present invention, the geological boundaries surrounding a channel 506 may be edited and updated in real-time. Referring to FIGS. 5A and 5B, display 500 is shown including a rug plot in original/edit mode (FIG. 5A) and updated mode (FIG. 5B). In FIG. 5A, the rug plot has been modeled by rug plot visualization application 110, which also determined the locations of geological boundaries 508 based upon the geological data and, thus, a DTBB 502 is plotted (after being calculated using, for example, primarily electromagnetic data from a drillstring petrophysical sensor) to the left and right of where well path 510 is located. Using Azimuthal resistivity data (received from a resistivity tool on the drill string), exemplary embodiments of the present invention invert for bed position around the borehole. The inversion is independent of the geological surface locations and provides a measure of quality control on the interpretation. In channel sands, such as channel 504, it is possible to be closer to the left or right boundary of the sand rather than the top or bottom and, hence, the result can be used to define the boundary location, as would be readily understood by those ordinarily skilled in the art having the benefit of this disclosure.

Still referring to FIG. 5A, as the drill string moved along well path 510 and transmitted real-time data related to the reservoir back to rug plot visualization application 110, DTBBs 502 at the lower end of the rug plot were determined to be in the right position and the geological model at this point needs to be adjusted accordingly. Thus, this exemplary embodiment of the present invention allows editing of the geological boundaries 508 to the left or right through utilization of a click and drag or other suitable function. As shown in FIG. 5B, the location of the geological boundaries 508 have been moved to reflect the true position of the DTBBs 502. Also, an "X" may be displayed adjacent the geological boundary 508 to allow further editing or deletion of the edited position of geological boundary 508 if desired. The edits are made in real-time and, thereafter, rug plot visualization application 110 recalculates the geological boundary 508 accordingly. Although not shown here, the same editing functionality may also be provided for in conjunction with the curtain plot, as would be understood by those ordinarily skilled in the art having the benefit of this disclosure.

As described herein, exemplary embodiments of the present invention provide several options for azimuthal visualization of the rug plot. In a first embodiment, the rug plot may be displayed alongside the curtain plot, thus allowing the geology to be viewed in 3D. Here, the rug plot orientation reflects a virtual horizontal slice of the geology along the well path as the well turns up and down, while the curtain plot reflects the virtual vertical slice of the geology along the well path following the left and right trajectory of the well. In a second embodiment, alternative plots of the rug plot could be modeled along specific TVD horizons. In a third exemplary embodiment, alternative plots of the rug plot could also be modeled along proportional horizons between structure model grid surfaces. Moreover, the center line for the display may be along the closure line or a specified azimuth line pinned to the projected bit.

Moreover, exemplary embodiments of the present invention are useful in geosteering applications. In embodiments where the determined well path is deviated and follows the apparent dip, an objective of the rug plot would be to capture the geology along the apparent dip by modeling the corresponding TVD slice as described herein. Other embodiments of the present invention are also useful in highly dipping formations where it is necessary to remain within a horizontal left-right zone. Moreover, the present invention is also useful for steering within channels. These and other advantages will be apparent to those ordinarily skilled in the art having the benefit of this disclosure.

Figure 6:
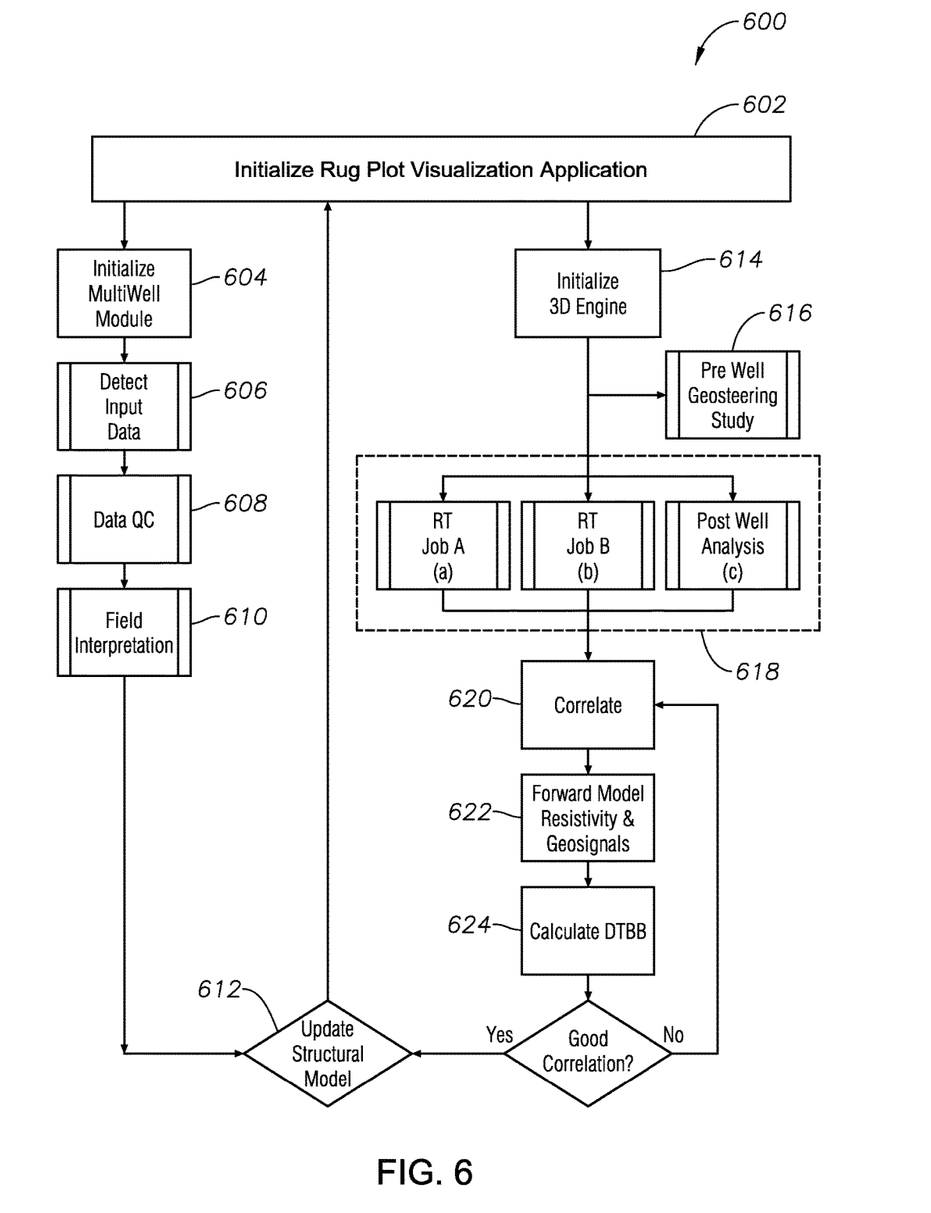
FIG. 6 is a rug plot workflow according to another exemplary methodology of the present invention.

Referring to FIG. 6, an exemplary methodology 600 of the present invention utilized in a geosteering application will now be described. At block 602, rug plot visualization system 100 is initialized. At block 604, rug plot visualization application 110 initializes multi-well module 114. At block 606, rug plot visualization application 110 detects the input data desired to be analyzed such as, for example, data relating to offset wells, surfaces, faults, log data and well trajectories. At block 610, rug plot visualization application 110 performs a quality check of the data to ensure the data is correct (for example, to ensure surfaces are located at the correct formation top location along each offset well, to ensure the log data is a true representation of the geology and not a physical artifact from the acquiring sensor, etc.). At is block 610, rug plot visualization application 110 allows a user to interpret the field by, for example, creating additional surfaces to define formation tops of interest, and rug plot visualization application 110 detects such entry accordingly. Then, at block 612, rug plot visualization application 110 updates the structural model of the formation and well path, which is then fed back into rug plot visualization system 100 for further operations.

While the forgoing operations are being performed by rug plot visualization system 100, at block 614, the 3D engine of rug plot visualization application 110 is initialized. At block 616, rug plot visualization application 110 may incorporate a pre-well geo-engineering study into the analysis. At block 618, rug plot visualization application 110 performs are variety of functions. At block 618(*a*) and (*b*), rug plot visualization application 110 enables analysis of real-time jobs A and B, respectively, in the same field (as the wells are being geosteered) to model and/or update the geosteered well path. In this embodiment, the data received from the job is real-time. At block 618(*c*), rug plot visualization application 110 enables performance of a post well analysis using historical data to document the actual well placement relative to the formation boundaries which may be different from the original interpretation. The analysis of block 618 may be performed manually or by rug plot visualization system 100, as will be understood by those ordinarily skilled in the art having the benefit of this disclosure.

Thereafter, at block 620, rug plot visualization application 110 enables users to correlate the offset well data to the real-time data received from the drilling assembly along the well path being geo-steered in order to determine if adjustments are necessary. In an alternative embodiment, rug plot visualization application 110 itself conducts the correlation of block 620. If it is determined that adjustments are necessary, the well path targets 402 (FIG. 4) are adjusted as necessary to remain within the optimal geological position. At block 622, rug plot visualization application 110 models the forward resistivity and geosignal data within the edited geological model to directly compare to the resistivity and geosignal data received from the drilling assembly which includes data related to real-time geologic characteristics of the formation. At block 624, rug plot visualization application 110 calculates the DTBB(s) 502 (FIG. 5) and displays then within the rug and curtain plots as previously described.

At block 624, a user may determine if there is a good correlation between the is calculated DTBB(s) 502 and the actual boundaries 508 as previously described. However, in an alternative embodiment, this determination may be made by rug plot visualization application 110 itself. If the user or rug plot visualization application 110 determines the correlation is good, the algorithm advances on to block 612 where the edited targets to define the well path and the edited geological boundaries are updated to the database, and the process continues as shown in FIG. 6. If, however, the user or rug plot visualization application 110 determines the correlation is not good, the user or rug plot visualization application 110 may move actual boundaries 508 to match those of calculated DTBB(s) 502 at block 620. In addition, as previously described, rug plot visualization application 110 allows correlation of the actual real-time well data to the offset data at block 620. Accordingly, since rug plot 208 and curtain plot 204 remain updated in real-time, the drilling assembly may be geo-steered to remain in the optimal position within the geology.

The foregoing methods and systems described herein are particularly useful in planning, altering and/or drilling wellbores. As described, the system provides a horizontal and vertical visualization along a desired TVD slice using a well path, for example. As such, a true 3D model is provided that is used to geo-steer a downhole assembly. Moreover, the 3D model may be updated in real-time based on actual downhole data and data received from offset wells. Accordingly, based on the 3D model, a wellbore may be planned, drilled/geo-steered in real-time and/or a well path may be altered.

In addition to drilling applications, the present invention in also applicable to other applications which benefit from 3D visualization of data acquired around the well bore such as, for example, stimulation operations.

Those of ordinary skill in the art will appreciate that, while exemplary embodiments and methodologies of the present invention have been described statically as part of implementation of a well placement plan, the methods may also be implemented dynamically. Thus, a well placement plan may be modeled and the data utilized as a geosteering tool to update the well plan for the drilling of wellbores. After implementing the well placement plan, the system of the invention may be utilized during the completion process on the fly or iteratively to determine optimal well trajectories, fracture initiation points and/or stimulation design as wellbore parameters change or are clarified or adjusted. In either case, the results of the dynamic calculations may be utilized to alter a previously implemented well placement or stimulation plan.

An exemplary methodology of the present invention provides a method to geosteer a downhole assembly, the method comprising analyzing data related to a geological formation, generating a geological model based upon the data related to the geological formation, generating a first plot which reflects a left and right orientation along a True Vertical Depth ("TVD") slice within the geological model and geosteering the downhole assembly using the first plot. Another method further comprises generating a second plot which reflects an up and down orientation along the TVD slice within the geological model and geosteering the downhole assembly using the first and second plots. Yet another method further comprises updating the geological model in real-time based upon at least one of data received from the downhole assembly during a downhole operation or data received from one or more offset wells. Another method further comprises updating a distance to bed boundary based upon data received from the downhole assembly during a downhole operation.

Another method further comprises determining an optimal well path along the left and right orientation of the TVD slice based upon real-time data received from the downhole assembly. In another, generating the first plot further comprises utilizing a well path as the TVD slice within the geological model. In yet another, geosteering the downhole assembly comprises geosteering a drilling assembly. Another method further comprises utilizing a variable TVD slice as the TVD slice.

Yet another exemplary methodology of the present invention provides a method to geosteer a downhole assembly, the method comprising modeling a rug plot that reflects a left and right orientation along a True Vertical Depth ("TVD") slice and geosteering the downhole assembly using the rug plot. In another, modeling the rug plot further comprises modeling a curtain plot that reflects an up and down orientation along the TVD slice, wherein the downhole assembly is geosteered using the rug and curtain plots. Yet another further comprises updating the rug plot in real-time based upon at least one of data received from the downhole assembly or data received from one or more offset wells. Another method further comprises updating a distance to bed boundary based upon data received from the downhole assembly during a downhole operation. Yet another further comprises utilizing a variable TVD slice as the TVD slice. In another, generating the rug plot further comprises utilizing a well path as the TVD slice within the geological model. In yet another, geosteering the downhole assembly comprises geosteering a drilling assembly.

Furthermore, the exemplary methodologies described herein may be implemented by a system comprising processing circuitry or a computer program product comprising instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method to geosteer a downhole assembly, the method comprising:
   obtaining data related to a geological formation using one or more sensors on the downhole assembly;
   analyzing the data using processing circuitry;
   generating a geological model based upon the data related to the geological formation;
   generating a first plot whereby the geological formation is virtually sliced along a well path such that a left and right orientation of the downhole assembly is visualized along a True Vertical Depth ("TVD") slice within the geological model;
   generating a distance to bed boundary within the first plot based upon data received from the downhole assembly;
   determining the distance to bed boundary does not reflect a true position of the distance to bed boundary;
   in response to an editing function, adjusting geological boundaries of the well path to the left or right orientation such that a distance to the adjusted bed boundary reflects the true position of the distance to bed boundary; and
   geosteering the downhole assembly using the first plot.

2. A method as defined in claim 1, further comprising:
   generating a second plot which reflects an up and down orientation along the TVD slice within the geological model; and
   geosteering the downhole assembly using the first and second plots.

3. A method as defined in claim 1, further comprising updating the geological model in real-time based upon at least one of:
   data received from the downhole assembly during a downhole operation; or
   data received from one or more offset wells.

4. A method as defined in claim 1, further comprising determining an optimal well path along the left and right orientation of the TVD slice based upon real-time data received from the downhole assembly.

5. A method as defined in claim 1, wherein generating the first plot further comprises utilizing a well path as the TVD slice within the geological model.

6. A method as defined in claim 1, wherein geosteering the downhole assembly comprises geosteering a drilling assembly.

7. A method as defined in claim 1, further comprising utilizing a variable TVD slice as the TVD slice.

8. A system comprising processing circuitry utilized to geosteer a downhole assembly, the processing circuitry performing the method comprising:
   obtaining data related to a geological formation using one or more sensors on the downhole assembly;
   analyzing the data;
   generating a geological model based upon the data;
   generating a first plot whereby the geological formation is virtually sliced along a well path such that a left and right orientation of the downhole assembly is visualized along a True Vertical Depth ("TVD") slice within the geological model;
   generating a distance to bed boundary within the first plot based upon data received from the downhole assembly;
   determining the distance to bed boundary does not reflect a true position of the distance to bed boundary; and
   in response to an editing function, adjusting geological boundaries of the well path to the left or right orientation such that a distance to the adjusted bed boundary reflects the true position of the distance to bed boundary,
   wherein the downhole assembly may be geosteered using the first plot.

9. A system as defined in claim 8, further comprising generating a second plot which reflects an up and down orientation along the TVD slice within the geological model, wherein the downhole assembly may be geosteered using the first and second plots.

10. A system as defined in claim 8, further comprising updating the geological model in real-time based upon at least one of:
    data received from the downhole assembly during a downhole operation; or
    data received from one or more offset wells.

11. A system as defined in claim 8, further comprising determining an optimal well path along the left and right orientation of the TVD slice based upon real-time data received from the downhole assembly.

12. A system as defined in claim 8, wherein generating the first plot further comprises utilizing a well path as the TVD slice within the geological model.

13. A system as defined in claim 8, wherein the downhole assembly is a drilling assembly.

14. A system as defined in claim 8, further comprising utilizing a variable TVD slice as the TVD slice.

15. A non-transitory computer program product comprising instructions utilized to geosteer a downhole assembly, the instructions which, when executed by at least one processor, causes the processor to perform a method comprising:
obtaining data related to a geological formation using one or more sensors on the downhole assembly;
analyzing the data;
generating a geological model based upon the data related to the geological formation;
generating a first plot whereby the geological formation is virtually sliced along a well path such that a left and right orientation of the downhole assembly is visualized along a True Vertical Depth ("TVD") slice within the geological model;
generating a distance to bed boundary within the first plot based upon data received from the downhole assembly;
determining the distance to bed boundary does not reflect a true position of the distance to bed boundary; and
in response to an editing function, adjusting geological boundaries of the well path to the left or right orientation such that a distance to the adjusted bed boundary reflects the true position of the distance to bed boundary,
wherein the downhole assembly may be geosteered using the first plot.

16. A computer program product as defined in claim 15, further comprising generating a second plot which reflects an up and down orientation along the TVD slice within the geological model, wherein the downhole assembly may be geosteered using the first and second plots.

17. A computer program product as defined in claim 15, further comprising updating the geological model in real-time based upon at least one of:
data received from the downhole assembly during a downhole operation; or
data received from one or more offset wells.

18. A computer program product as defined in claim 15, further comprising determining an optimal well path along the left and right orientation of the TVD slice based upon real-time data received from the downhole assembly.

19. A computer program product as defined in claim 15, wherein generating the first plot further comprises utilizing a well path as the TVD slice within the geological model.

20. A computer program product as defined in claim 15, wherein the downhole assembly is a drilling assembly.

21. A method to geosteer a downhole assembly, the method comprising:
using processing circuitry, modeling a rug plot that reflects a virtual slice of geological formation along a well path such that a left and right orientation of the downhole assembly is visualized along a True Vertical Depth ("TVD") slice;
using the processing circuitry, predicting a distance to bed boundary ahead of the downhole assembly within the first plot based upon data received from one or more sensors of the downhole assembly; and
geosteering the downhole assembly using the rug plot.

22. A method as defined in claim 21, wherein modeling the rug plot further comprises modeling a curtain plot that reflects an up and down orientation along the TVD slice, wherein the downhole assembly is geosteered using the rug and curtain plots.

23. A method as defined in claim 21, further comprising updating the rug plot in real-time based upon at least one of:
data received from the downhole assembly; or
data received from one or more offset wells.

24. A method as defined in claim 21, further comprising:
determining the distance to bed boundary does not reflect a true position of the distance to bed boundary; and
in response to an editing function, adjusting geological boundaries of the well path to the left or right orientation such that a distance to the adjusted bed boundary reflects the true position of the distance to bed boundary.

25. A method as defined in claim 21, further comprising utilizing a variable TVD slice as the TVD slice.

26. A method as defined in claim 21, wherein generating the rug plot further comprises utilizing a well path as the TVD slice within the geological model.

27. A method as defined in claim 21, wherein geosteering the downhole assembly comprises geosteering a drilling assembly.

* * * * *